Oct. 21, 1969  J. C. STEIN  3,473,911
ADJUSTABLE ORIFICE APPARATUS FOR FORMING GLASS FILMS
Filed Oct. 19, 1965  2 Sheets-Sheet 1

INVENTOR.
John C. Stein
BY
ATTORNEY

INVENTOR.
John C. Stein
BY
ATTORNEY

United States Patent Office 3,473,911
Patented Oct. 21, 1969

3,473,911
ADJUSTABLE ORIFICE APPARATUS FOR
FORMING GLASS FILMS
John C. Stein, Horseheads, N.Y., assignor to Corning
Glass Works, Corning, N.Y., a corporation of New
York
Filed Oct. 19, 1965, Ser. No. 497,954
Int. Cl. C03b 17/00
U.S. Cl. 65—325                                                 7 Claims

ABSTRACT OF THE DISCLOSURE

An orifice structure for forming thin films of vitreous material having rough and fine exterior adjustments for maintaining a constant orifice width along its extent to provide a uniform film without distortion. The orifice structure includes complementary opposed half orifice sections with a pair of spacer members positioned between the ends of said orifice sections, and having end sections formed in each end of each half orifice section so as to complement the end contour of the spacer members.

---

In many instances materials, such as glass, are required to be formed into films .0005″ or less in thickness. For many secondary operations thereon, it is required that the surface of the glass be flat and not wavy or warped. Known orifice designs are unable to provide such thin film.

It has been found that slot configuration and width, particularly near the ends of the orifice, are critical areas of design. If the slot's ends are too wide, the emerging glass is too hot and does not anchor securely to the orifice. Thus, if the speed of a pulling machine is increased to thin down the sheet, the glass thins down only to a certain point and then pulls away from the edges, narrows down, and eventually the draw is lost.

If the reverse situation exists and the slot ends are too thin, the glass cools down too rapidly and causes the flow to be lower at the ends than in the center section of the orifice. Thus, if the speed of the pulling machine is increased, the edges of the glass sheet are anchored, but because of lower glass flow, they are thinner. Since the edges are thinner, they set up long before the center is drawn to the desired thickness. A point in the pulling speed is eventually reached at which the edges of the sheet tear, thus breaking down the draw.

Some known devices provide bridges spanning the orifice opening in order to hold or maintain a uniform slot width. The purpose of the bridges is to maintain proper orifice shape and uniform width of orifice opening along the length of the orifice. However, the bridges of these devices starve the orifice for glass in their immediate area, thus producing bands of thinner glass across the width of the sheet being drawn. As a result the ribbon ripples causing a zipper-like effect in the glass. The general condition of the sheet might best be described as "wavy." Sheets in this condition are useless for many secondary operations.

A preferred embodiment of the present invention set forth and described in detail hereinafter, in its simplest form comprises an adjustable orifice assembly and means for adjusting the width of the orifice slot. The adjustability of the orifice makes it possible to produce very thin sheets of material with a uniform cross section. The glass sheet produced is flat enough for secondary operations which may require the glass to pass between hard rolls without breaking.

The orifice adjusting means provides a course and fine adjusment from a rigid reference point or bar. The course adjustment is used to overcome general orifice warp which may occur during heat-up or to make major gap-width changes. The fine adjustment is used to make localized adjustments as dictated by variations in the sheet cross section.

Basically the orifice forms a slot of definite shape through which molten glass flows. The glass is attenuated vertically to form a thin film. As the glass leaves the ends of the slot, it is in a semi-rigid state to retard horizontal attenuation.

The adjustment mechanism is designed to provide dual adjustment. A plurality of opposing pairs of fine adjustment screws are connected to the orifice symmetrically about the transverse centerline. These screws are terminated at a pair of reference bars in a differential thread system which allows a relatively slight lateral adjustment of each screw for each revolution of a differential adjustment nut connected thereto. These screws are used for fine adjustment as dictated by the glass film cross section dimensions. A plurality of opposing pairs of rought-adjustment bolts are connected to the reference bars, centered between the fine adjustment screws, and terminated at their outer ends in a very rigid support block. These rough-adjustment bolts are used basically to overcome orifice warping.

It thus has been an object of the present invention to provide an orifice to be used in forming glass films approximately .0005″ or less in thickness and up to 5′ wide without sharp wrinkled distortions.

Another object of the present invention is to provide an orifice which eliminates the necessity of strengthening bridges across the slot and thus eliminates the characteristic streaks and thickness variations associated with bridges.

An additional object of the present invention is to provide an improved unobstructed orifice for forming thin glass sheet of improved quality and flatness.

A further object of the present invention is to provide an adjustable orifice for continuously producing sheet material that will overcome orifice warping and make possible a variation in slot width while the orifice is installed under glass.

An additional object of the present invention is to provide an orifice which stabilizes a drawing operation and increases the production rate.

A further object of the present invention is to provide an orifice for forming a stable, thin sheet of glass during a continuous drawing process.

Other and further objects, features and advantages will be apparent from the following description of presently preferred embodiments of the invention, given for the purpose of disclosure and taken in conjunction with the accompanying drawings, where like character references designate like parts throughout the several views and wherein.

As shown by the drawings, the preferred embodiment of the present invention comprises an adjustable orifice assembly O, means A for adjusting the width of the orifice slot and a supporting frame F which attaches to and supports the orifice assembly O and the adjusting means A.

Figure 1:
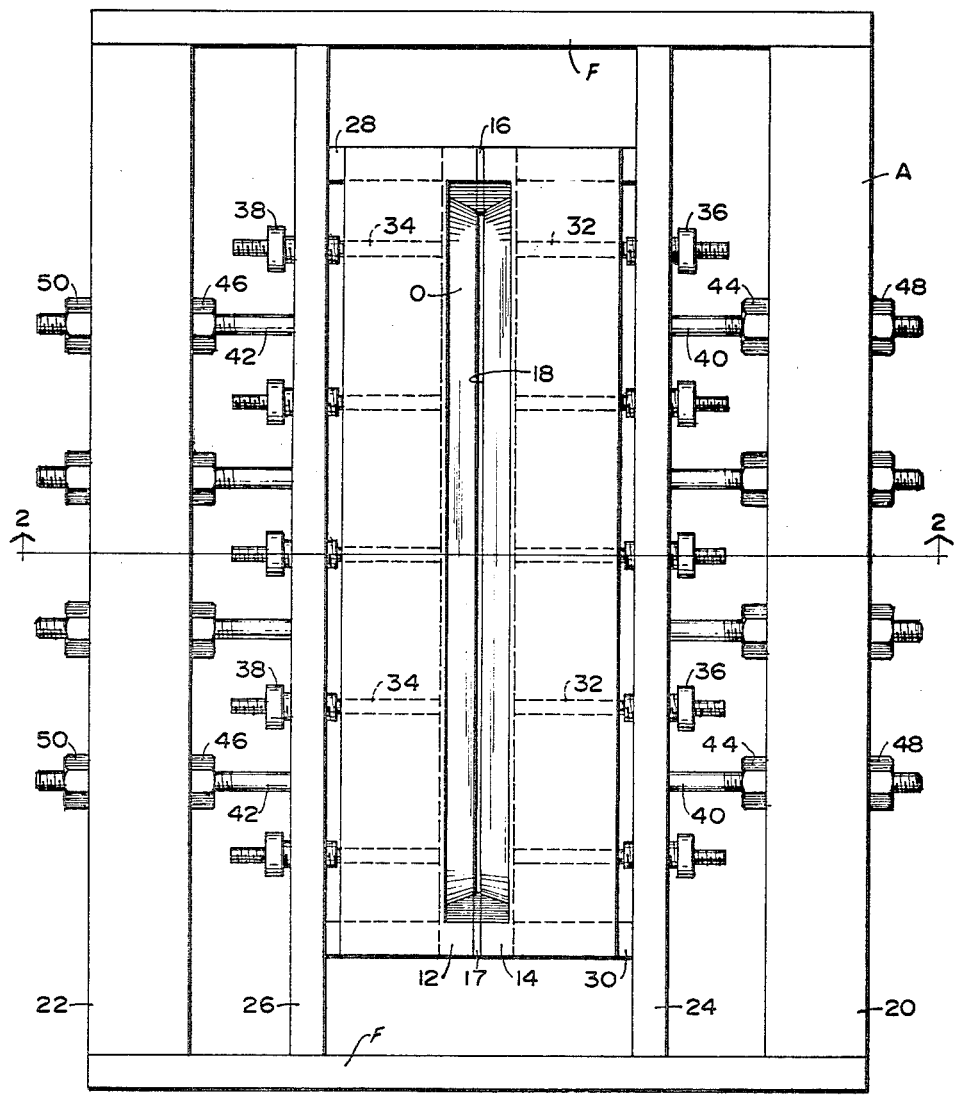
FIG. 1 is a plan view of an adjustable orifice assembly and means for adjusting the width of the orifice slot.
Figure 3:
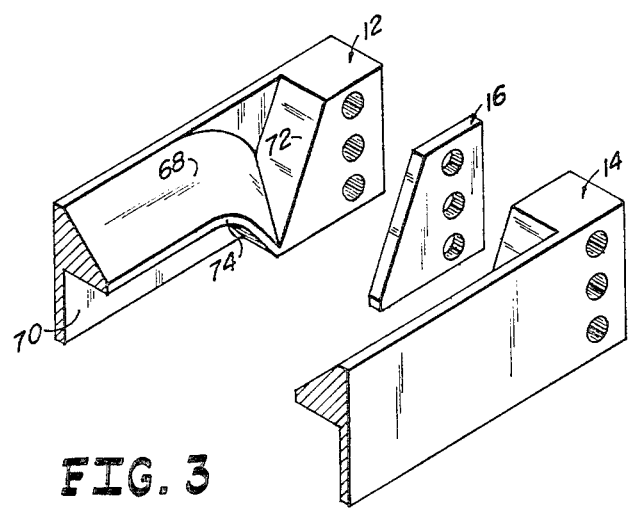
FIG. 3 is a fragmentary exploded perspective view of an orifice end portion, illustrating the assembly of a spacer between two half orifices; and, FIG. 4 is an elevational view of a half orifice.

Referring now to FIG. 1 the adjustable orifice assembly O is shown comprising a pair of opposed half orifice sections 12 and 14 separated by a spacer at each end thereof, such as spacers 16 and 17 (see also FIG. 3).

The orifice sections 12 and 14 and the spacers 16 and 17 may be held together by any suitable means, such as bolts. When the orifice sections and spacers are thus united, a slot 18 is formed between the two half orifice sections with the spacers 16 and 17 forming the ends of the slot. The spacers are used to determine the basic width of the orifice opening. Thus, a thinner spacer may be used when making films with a major reduction in thickness.

The adjusting means A comprises a pair of rigid support blocks or stops 20 and 22 attached to frame F in a spaced-apart relationship parallel and outside the slot 18 of the adjustable orifice assembly O. The blocks 20 and 22 are constructed of such material and in such a manner that they are laterally inflexible. A pair of reference bars 24 and 26 are attached to frame F. The reference bar 24 is positioned in a spaced-apart parallel relationship between the adjustable orifice assembly O and rigid support block 20. The bar 26 is positioned in a spaced-apart parallel relationship between assembly O and block 22. The bars 24 and 26 although fixed at their respective ends are laterally flexible.

A pair of orifice support frames 28 and 30 are attached between the reference bars 24 and 26 to support the end portions of the adjustable orifice assembly O.

Figure 2:
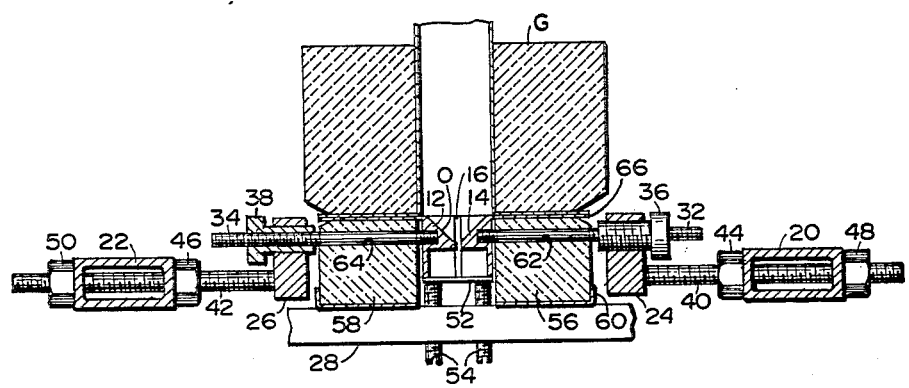
FIG. 2 is a sectional view taken along line 2—2 of FIG. 1.

As also shown in FIG. 2, a plurality of means for fine adjustment, such as opposing screws or rods 32 and 34, are respectively attached to the half orifice sections 12 and 14 in a spaced-apart parallel relationship and normal thereto. In a preferred embodiment of the present invention the rods 32 and 34 have a differential thread system to provide a small, accurate lateral motion to the respective half orifice. The rods 32 and 34 are adjustably affixed to the reference bars 24 and 26 by internally and externally threaded orifice adjustment nuts 36 and 38, respectively, which provide the desired differential thread system.

A plurality of means for rough adjustment, such as opposing rough adjustment bolts 40 and 42, are attached to the reference bars 24 and 26 in a spaced-apart parallel relationship and normal thereto. The bolts 40 and 42 pass through and are supported by rigid blocks 20 and 22 respectively. Positioner nuts 44 and 46 are attached to bolts 40 and 42 and positioned between their respective reference bars and rigid bars. Locking nuts and 48 and 50, positioned outside the reference bars, are attached to bolts 40 and 42. The locking nuts and positioner nuts cooperate in a known manner to provide rough lateral adjustment to the reference bars from which small, accurate adjustment can be made in the width of slot 18.

Thus a course adjustment is provided to overcome general orifice warp at heat up or to make major gap-width changes. The fine adjustment is used primarily to make localized adjustments as dictated by variations in the sheet cross section.

As shown in FIG. 2 a rest 52 supports the end portion of orifice sections 12 and 14 and spacer 16. A pair of set screws mount through the orifice support frame 28 and support the rest 52 for leveling and supporting the orifice. In a preferred embodiment of the present invention the opposite end portion of the adjustable orifice assembly is mounted in a similar fashion. Thus the level of the orifice may be adjusted at either end.

The heat transfer of the orifice assembly O is regulated by refractories 56 and 58 which are held by orifice refractory support 60. The support 60 rests on the orifice support frame 28, 30. The rods 32 and 34 pass through bores 62 and 64 respectively in the refractories 56 and 58.

Glass delivery means G provides molten glass to the orifice through which the glass film is formed. An orifice seal 66 separates glass delivery means G and refractories 56 and 58 to prevent leakage of the glass.

Figure 4:
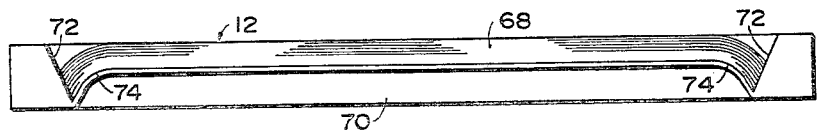

As shown in FIGS. 3 and 4 a half orifice section comprises a downwardly-sloped delivery lip 68 and a depending skirt 70 attached to the lip 68. At each end of the half orifice is an inwardly inclined deflecting end section 72. The ends of the delivery lip are terminated in downwardly-extending arcuate portions 74 below the horizontal portion of the lip 68. The delivery lip 68 becomes conical at its end portions as it meets the deflecting sections 72.

The ends of the slot 18 are terminated by curving downwardly so that the glass will remain anchored at such ends. Using the preferred orifice where the slot is terminated in a downwardly-extending arc at each end thereof, the point of termination along such arc is critical for the production of good continuous sheet. The slot uses that portion of the terminating arc which will allow the sheet to become rigid along a line parallel with the longitudinal extent of the orifice and in a horizontal plane which intersects with the ends of the slot. If the glass becomes rigid above this horizontal plane the film will break, and if the glass is not rigid in this plane the sheet will attenuate. In either cases the drawing process becomes discontinuous. The temperature of the glass and/or orifice is adjusted by conventional heating and cooling means so that the glass sets up within such a horizontal plane intersecting the arcuate orifice ends.

The glass delivery system provides glass delivered to the orifice at a uniform temperature. By adjusting orifice slot width, orifice temperature and drawing speeds, it is possible to produce glass sheet approximately .0005" thick. The glass films formed are flexible and are able to demonstrate sufficient strength so that they can support themselves in a 30 foot catenary.

Thus the present invention discloses an adjustable bridgeless orifice for forming thin films of vitreous materials which films are uniform in cross section and without distortion.

I claim:
1. An adjustable orifice assembly for forming a uniform thin film of distortionless glass which comprises,
   a pair of complementary opposed half orifice sections,
   a pair of spacer members positioned between said opposed half orifice sections adjacent the ends thereof to define the width of the orifice opening formed by said half orifice sections and define the longitudinal ends of said opening,
   said half orifice sections each having a downwardly-inwardly sloped delivery lip with a depending skirt attached to an outer surface thereof,
   a downwardly inclined deflecting end section formed in each end of each half orifice section complementing the end contour of said spacer members, and
   each end of said delivery lips terminating in a downwardly extending arcuate portion intersecting said deflecting sections.

2. Apparatus for forming thin films of vitreous material comprising, an orifice assembly forming a longitudinal delivery slot of uniform width, means for fine adjusting and means for rough adjusting the width of said slot while said assembly is in operation to compensate for thermal warpage and provide vitreous film of uniform cross section along its entire longitudinal length, said orifice assembly including a pair of opposed half orifice sections forming a delivery orifice slot therebetween, a pair of spacer blocks separating the half orifice sections with one such block positioned between each end portion of said opposed sections, and said spacer blocks forming a downwardly inclined end portion of the slot and defining the width of the orifice slot through which thin films of vitreous material may be drawn.

3. Apparatus as defined in claim 2 wherein the means for adjusting the width of the orifice comprises:
   rigid support blocks positioned in a spaced-apart relationship parallel and outside both sides of the orifice assembly;
   reference bars positioned in a spaced-apart parallel relationship between the orifice assembly and the rigid support blocks;
   said means for fine adjustment attached between the opposed half orifice sections and reference bars; and said means for rough adjustment attached between the reference bars and the rigid support blocks.

4. Apparatus as defined in claim 3 wherein the means for fine adjustment comprises:
   a plurality of opposing rods attached in a normal relationship to the orifice half sections; and
   nuts having a differential thread system affixing the rods to the reference bars for making small localized adjustment in the width of the orifice slot.

5. Apparatus as defined in claim 3 wherein the means for rough adjustment comprises:
   a plurality of opposing pairs of rough-adjustment bolts connected to the reference bars and supported by the rigid support blocks; and
   a plurality of nuts threaded to the bolts to provide lateral adjustment for overcoming general orifice warp which may occur during heat-up or when making major gap-width changes.

6. Apparatus as defined in claim 5 wherein the rough adjustment bolts connected to the reference bars are laterally centered between the means for fine adjustment.

7. In combination with means for delivering a supply of molten glass, an adjustable orifice assembly comprising: a pair of opposed half orifice sections, a plurality of spacer means positioned between end portions of the opposed half orifice sections for determining the width and defining the longitudinal ends of the orifice slot through which the supply of molten glass flows to form a thin film of glass, each half orifice section having a downwardly sloped delivery lip, downwardly extending arcuate means adjacent each end of said delivery lip for facilitating the solidification of a glass film within a horizontal plane intersecting an end portion of the orifice slot, and downwardly inclined deflecting end sections formed at each end of the orifice complementing said spacer means to form end portions of both the orifice assembly and slot.

References Cited

UNITED STATES PATENTS

| | | | |
|---|---|---|---|
| 1,572,581 | 2/1926 | Troutman et al. | 65—126 |
| 1,626,382 | 4/1927 | Blair | 65—193 |
| 2,422,466 | 6/1947 | Brown | 65—193 |
| 2,838,880 | 6/1958 | Bailey et al. | 65—325 |
| 3,053,012 | 9/1962 | Chew | 65—164 |
| 3,096,543 | 7/1963 | Konopacke et al. | |

S. LEON BASHORE, Primary Examiner.

E. R. FREEDMAN, Assistant Examiner

U.S. Cl. X.R.

65—126, 161, 162, 164, 333